(12) United States Patent
Aliakbarzadeh et al.

(10) Patent No.: US 7,726,276 B2
(45) Date of Patent: Jun. 1, 2010

(54) METHOD FOR ADAPTING VARIATIONS IN CYLINDER-SELECTIVE INJECTION QUANTITIES OF A DIRECT INJECTION SYSTEM AND METHOD FOR CYLINDER-SELECTIVELY CONTROLLING INJECTION

(75) Inventors: Reza Aliakbarzadeh, Regensburg (DE); Stephan Wenzel, München (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 12/282,465

(22) PCT Filed: Feb. 2, 2007

(86) PCT No.: PCT/EP2007/051006

§ 371 (c)(1),
(2), (4) Date: Oct. 28, 2008

(87) PCT Pub. No.: WO2007/104608

PCT Pub. Date: Sep. 20, 2007

(65) Prior Publication Data

US 2009/0204311 A1    Aug. 13, 2009

(30) Foreign Application Priority Data

Mar. 14, 2006    (DE) .................. 10 2006 011 723

(51) Int. Cl.
F02B 3/00    (2006.01)
B60T 7/12   (2006.01)
(52) U.S. Cl. ............ 123/299; 701/104; 123/305
(58) Field of Classification Search .............. 123/673, 123/687, 294, 299, 300, 304, 305; 701/109, 701/103, 104
See application file for complete search history.

(56) References Cited

U.S. PATENT DOCUMENTS

| | | | | |
|---|---|---|---|---|
| 4,718,015 A | * | 1/1988 | Grob et al. ............ | 701/103 |
| 5,131,371 A | * | 7/1992 | Wahl et al. ............ | 123/436 |
| 5,615,654 A | | 4/1997 | Weismann, II et al. ...... | 123/350 |
| 6,276,349 B1 | * | 8/2001 | Kofler et al. ............ | 123/673 |

FOREIGN PATENT DOCUMENTS

| | | |
|---|---|---|
| DE | 197 00 711 A1 | 9/1998 |
| DE | 198 46 393 A1 | 4/2000 |
| DE | 102 53 906 A1 | 6/2004 |
| DE | 103 43 759 A1 | 4/2005 |
| EP | 1 336 745 A2 | 8/2003 |
| EP | 1 382 822 A2 | 1/2004 |
| EP | 1 424 475 A2 | 6/2004 |

* cited by examiner

Primary Examiner—John T Kwon
(74) Attorney, Agent, or Firm—King & Spalding L.L.P.

(57) ABSTRACT

In a method for adapting variations in cylinder-selective injection quantities of a direct injection system of an internal combustion engine with a plurality of cylinders, factorial and additive adaptive values are determined in order to be able to reliably adjust a given lambda value for the entire engine even in the event of a multiple injection.

13 Claims, 2 Drawing Sheets

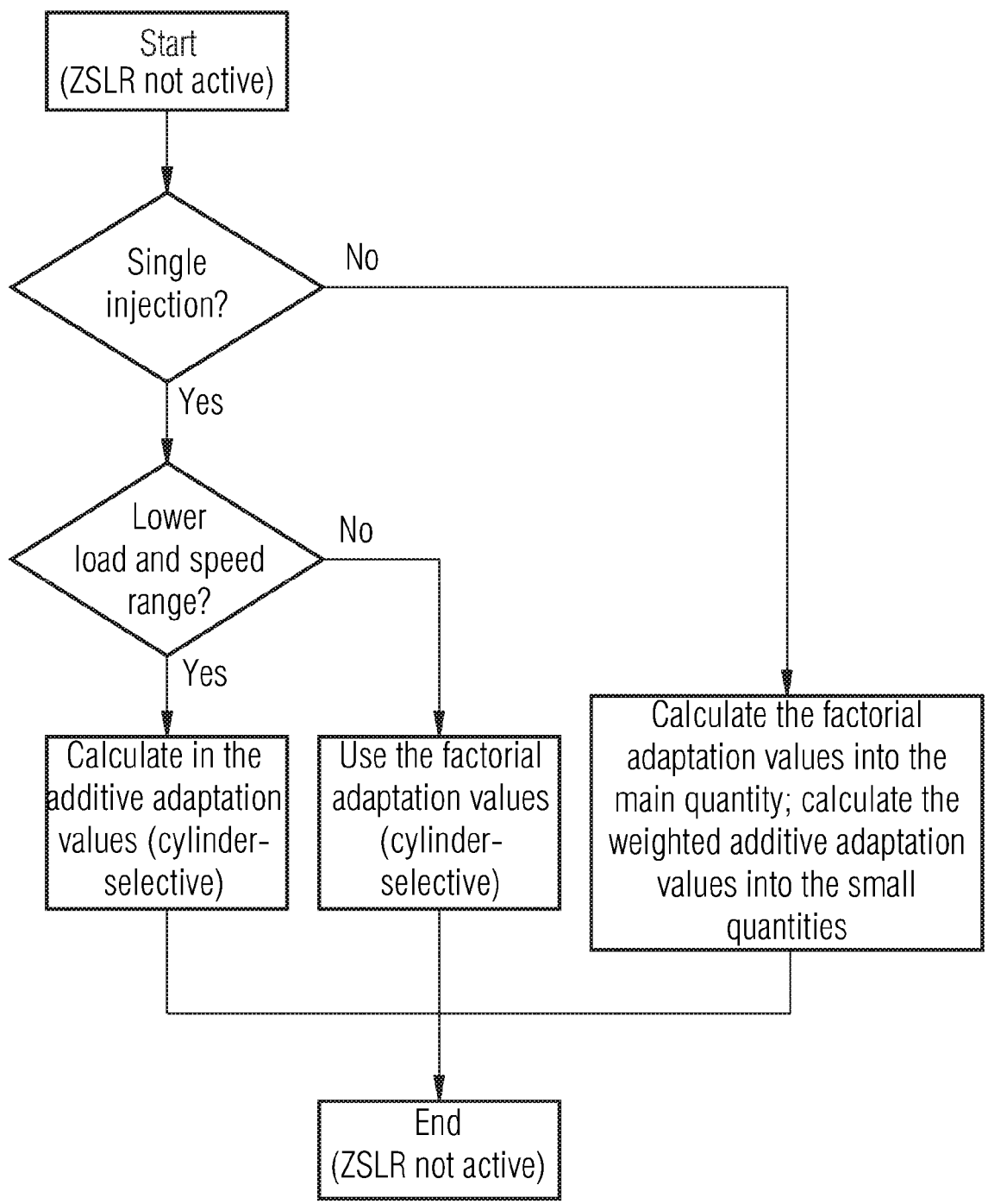

METHOD FOR ADAPTING VARIATIONS IN CYLINDER-SELECTIVE INJECTION QUANTITIES OF A DIRECT INJECTION SYSTEM AND METHOD FOR CYLINDER-SELECTIVELY CONTROLLING INJECTION

CROSS-REFERENCE TO RELATED APPLICATIONS

This application is a U.S. national stage application of International Application No. PCT/EP2007/051006 filed Feb. 2, 2007, which designates the United States of America, and claims priority to German application number 10 2006 011 723.9 filed Mar. 14, 2006, the contents of which are hereby incorporated by reference in their entirety.

TECHNICAL FIELD

The present invention relates to a method of adapting variations in cylinder-selective injection quantities of a direct-injection system of an internal combustion engine as well as to a method for cylinder-selective injection control in this internal combustion engine.

BACKGROUND

In Otto engines Lambda probes are used to determine the exhaust gas composition in order to comply with the statutory requirements in relation to restricting pollutant emissions. In order to comply with current and future exhaust gas legislation requirements catalytic converter systems close to the engine are increasingly being used to convert the pollutants. Because of the short exhaust gas mixing path between the exhaust valves of the cylinder and the catalytic converter these demand a low tolerance in the fuel-air ratio between the cylinders of an exhaust bank of an internal combustion engine by comparison with catalytic converters arranged away from the engine. A catalytic converter is arranged away from the engine for example if the catalytic converter is mounted under the vehicle floor. For such systems with catalytic converters arranged close to the engine, in which as well as an optimization of the flow formation for mixing the exhaust gases, the said small tolerance in the fuel-air ratio between the cylinders of an exhaust bank of the internal combustion engine is required, cylinder-selective Lambda control is also used in addition to the conventional Lambda control.

In recent times it is precisely the cylinder-selective Lambda control based on the use of piezo injectors that has increased in importance. As well as their many advantages, these types of injector are also characterized by their high tolerance to variations.

The cylinder-selective Lambda control requires as its input signal a measure for the fuel-air ratio of each individual cylinder of the internal combustion engine. Since usually however only one Lambda probe is used for all cylinders of an exhaust bank, the Lambda values for each individual cylinder must be obtained from the signal of this Lambda probe. The prerequisite for detecting the cylinder-selective Lambda variations is for sufficient information (useful signal) to be able to be derived from the probe signal. Since the signal of the linear Lambda probe is overlaid with noise in the sampling frequency band, the amplitude of the useful signal must be much higher than that of the noise signal. Furthermore it must be ensured that, depending on the configuration of the exhaust system and the position of the Lambda probe, the signal quality of the useful signal falls as the exhaust mass flow decreases. The disadvantage emerging from this is that in the lower load range the signal strength of the useful signal disappears in noise. Thus under these conditions a stable control of the exhaust composition the aid of the useful signal cannot be guaranteed.

In order to provide a stable Lambda control the function of cylinder-selective Lambda control was previously switched off in the lower load and speed range of the internal combustion engine. The disadvantage of doing this is that there is no compensation for the cylinder-selective variations of the injection system in the lower load range. Thus the adaptation values which are learned in the mid load and speed range of the internal combustion engine with the aid of the cylinder-selective Lambda control function (ZSLR) are not able to be transferred to the lower load and speed range of the internal combustion engine.

SUMMARY

A method for cylinder-selective injection control of an internal combustion engine can be provided with which compliance with statutory requirements for pollutant emissions is guaranteed.

According to an embodiment, a method for adapting variations in cylinder-selective injection quantities of a direct injection system of an internal combustion engine with a plurality of cylinders, may comprise the steps of: a) Injecting a prespecified cylinder-specific fuel quantity as a single quantity into the cylinder in accordance with a prespecified Lambda value, b) Determining a cylinder-selective Lambda value and comparison of the prespecified Lambda value with the cylinder-selective Lambda value determined, c) Determining a first adaptation value for the single prespecified cylinder-specific fuel quantity, so that the prespecified and the determined cylinder-selective Lambda value can be synchronized, d) Injecting into the cylinder the prespecified cylinder-specific fuel quantity adapted with the first adaptation value in the form of a plurality of fuel quantities and repetition of step b), and e) Determining a second adaptation value for the prespecified cylinder-specific fuel quantity adapted with the first adaptation value in the form of the plurality of injection quantities, so that the prespecified and the determined cylinder-selective Lambda value are able to be synchronized.

According to a further embodiment, the first adaptation value can be a factorial adaptation value and the second adaptation value is an additive adaptation value. According to a further embodiment, the injection only may take place if the internal combustion engine is in a practically constant operating state, so that comparability between single and multiple injection is guaranteed. According to a further embodiment, the plurality of injection quantities may consist of a main quantity and at least one small quantity. According to a further embodiment, the first and the second adaptation value may be determined in the average load range of the internal combustion engine. According to a further embodiment, the second adaptation value determined in the mid load range may be applied in the lower load range of the internal combustion engine on injection of a plurality of injection quantities.

According to another embodiment, a method for cylinder-selective injection control in an internal combustion engine with injection system, may comprise the following steps: a) Adapting a prespecified cylinder-specific fuel quantity with first and second adaptation values in accordance with one of the previous claims, before the fuel quantity is injected in the form of a plurality of fuel quantities, b) Adapting the prespecified cylinder-specific fuel quantity with the second adaptation value, before the fuel quantity is injected in a lower load and speed range in the form of a single fuel quantity, and c) Adapting the prespecified cylinder-specific fuel quantity with the first adaptation value, before the fuel quantity is injected in a range other then the lower load and speed range in the form of a single injection quantity.

BRIEF DESCRIPTION OF THE DRAWINGS

The preferred embodiments of the present invention are explained in greater detail with reference to the accompanying drawings. These show.

DETAILED DESCRIPTION

Figure 1:
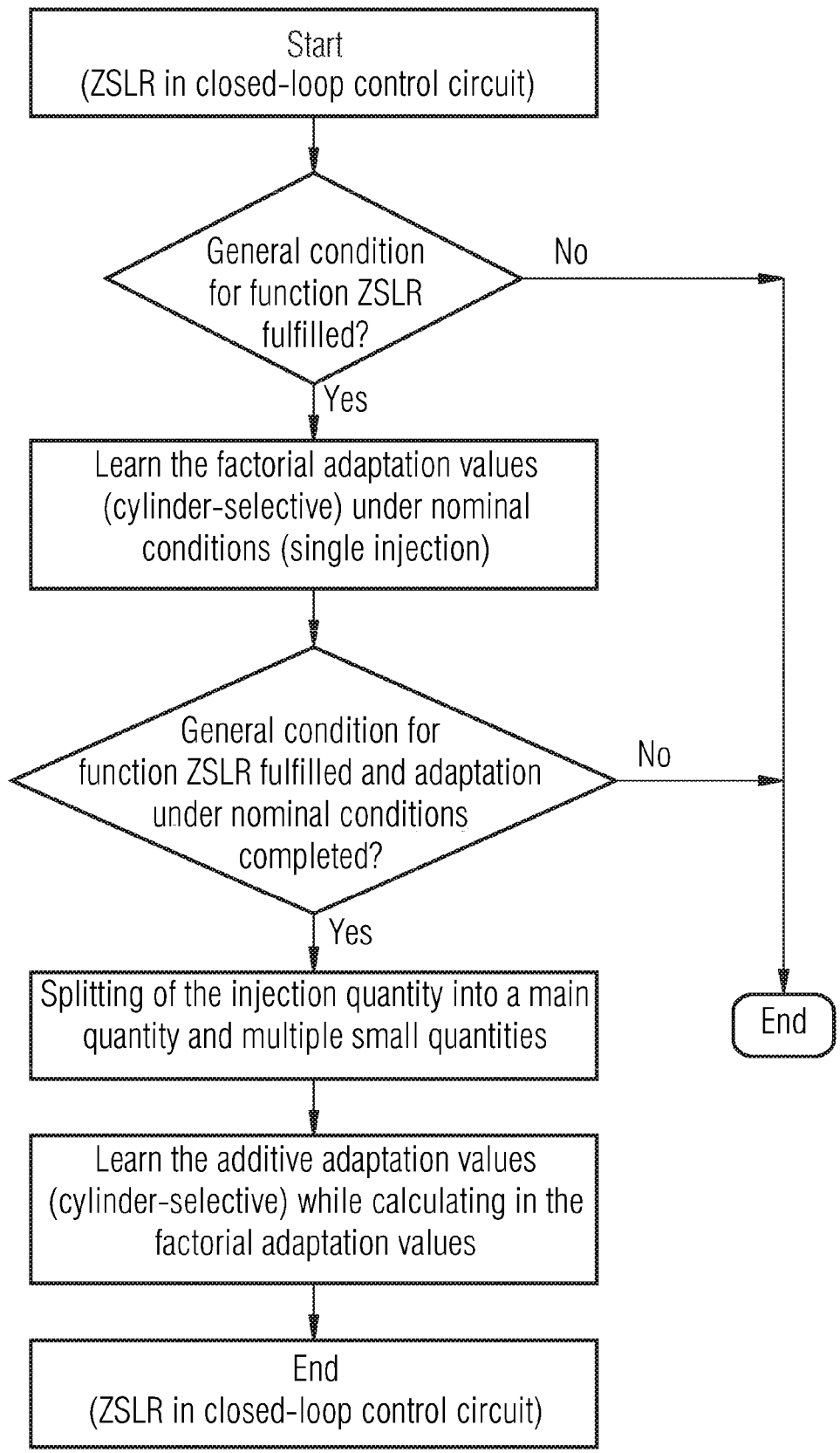
FIG. 1 a schematic diagram of a preferred program execution sequence for cylinder-selective Lambda control in a closed-loop control circuit, and FIG. 2 a schematic diagram of a preferred program execution sequence for non-active cylinder-selective Lambda control.

The above-mentioned adaptation method for variations in cylinder-selective injection quantities of a direct injection system of an internal combustion engine with a plurality of cylinders includes the following steps: a) Injecting a prespecified cylinder-specific quantity of fuel as a single quantity into the cylinder in accordance with a prespecified global motor Lambda value, b) Determining a cylinder-selective Lambda value and comparing the determined Lambda value with the specific cylinder-selective Lambda value c) Determining a first adaptation value for the single prespecified cylinder-specific fuel quantity, so that the prespecified and the determined cylinder-selective Lambda values are able to be synchronized, d) Injecting the prespecified cylinder-specific fuel quantity adapted with the first adaptation value in the form of a plurality of injection quantities into the cylinders and repeating step b) and e) Determining a second adaptation value for the prespecified cylinder-specific fuel quantities adapted with the first adaptation value in the form of the plurality of injection quantities, so that the prespecified and the determined cylinder-selective Lambda value are able to be synchronized.

The direct injection systems of current internal combustion engines have the advantageous characteristic of the overall quantity of fuel, divided up into a number of part quantities of fuel being able to be brought by multiple injection into the corresponding cylinder of the internal combustion engine before ignition. Investigations have shown that a division of the overall quantity of fuel into, for example, a main quantity at least one residual quantity produces a cylinder-selective Lambda variation. If this cylinder-selective Lambda variation was determined in the mid speed and load range of the internal combustion engine it was likewise established that practically the same Lambda variation occurs in the lower speed and load range of the internal combustion engine if an injection quantity corresponding to the residual quantity from the mid speed and load range is multiply injected in the lower speed and load range. The method utilizes this characteristic by considering the cylinder-selective Lambda difference during the splitting up of the overall fuel quantity into main quantity and residual quantity as an offset which occurs in the same way in the lower speed and load range of the internal combustion engine if the injection quantity injected multiple times in this range corresponds to the residual quantity from the above mid load range of the internal combustion engine. In this way actual Lambda variations in the mid load range of the internal combustion engine are reconstructed and applied to the lower load range of the internal combustion engine. The reconstructed measurement variables form the input of a closed-loop control or adaptation algorithm that is used for regulating out and adapting the variations in the cylinder-selective injection volumes of the direct-injection system.

In accordance with one embodiment the first adaptation value is a factorial adaptation value and the second adaptation value is an additive adaptation value. In accordance with a further embodiment of the present adaptation method injection only takes place if the internal combustion engine is in a practically constant operating state so that comparability between single and multiple injection is guaranteed. In accordance with one embodiment multiple injections are implemented with the aid of the injection system. Should this not be technically possible the injection quantity or mass is divided up within the framework of the adaption method into a main and an auxiliary quantity or a main and auxiliary mass.

In accordance with a further embodiment the factorial and the additive adaptation values are determined in the mid load and speed range of the internal combustion engine. This guarantees a sufficient strength of the useful signal so that a cylinder-selective evaluation of the measured Lambda signal is reliably guaranteed despite the occurrence of noise. If the additive adaptation values determined in the mid load range are present these are applied in the lower load range of the internal combustion engine on injection of a plurality of injection quantities, provided these injection quantities correspond to the above residual quantities of the additive adaptation values.

According to another embodiment, a method for cylinder-selective injection control in an internal combustion engine with injection system may comprise the following steps: a) Adaptation of a prespecified cylinder-specific fuel quantity with first and second adaptation values in accordance with the above adaptation method, before the fuel quantity is injected in the form of a plurality of injection quantities, b) Adaptation of the prespecified cylinder-specific fuel quantity to the second adaptation value before the fuel quantity is injected in a lower load and speed range in the form of a single injection quantity, and c) Adaptation of the prespecified cylinder-specific fuel quantity with the first adaptation value before the fuel quantity is injected in a load and speed range other than the lower load and speed range in the form of a single injection quantity.

The first, preferably factorial, and second, preferably additive, adaptation values are applied using a preferred selection algorithm by a suitable selection in different engine operating modes or load and speed ranges of the internal combustion engine. In this way the variations in the injection quantities and the fluctuations produced thereby in the air-fuel ratio are minimized.

The above method thus compensates for the cylinder-selective injection variations of the direct injection valves in the lower load range. This is made possible by the fact that the air-fuel ratios of the lower load range of the internal combustion engine are mapped or simulated in its mid load range. Preferably this mapping or simulation may be implemented with the aid of multiple injections in the mid load range of the internal combustion engine.

The present invention is explained in greater detail on the basis of an embodiment shown schematically in FIG. 1. In this flowchart the abbreviation ZSLR stands for the cylinder-selective Lambda control which is executed here in a closed-loop control circuit.

After the method has been started during operation of the motor vehicle, or more generally of the internal combustion engine, it first asks whether the general conditions for executing the cylinder-selective Lambda control are fulfilled. These conditions ask whether the internal combustion engine is at an almost constant operating point so that, within the operating point, control functions are able to be executed with comparison method steps. The operating point of the internal combustion engine is for example characterized by a specific load range, a speed, a torque or a defined air mass supply. Should these general conditions of the ZSLR be fulfilled, the method moves to the next step (cf. "Yes" arrow).

The above conditions are not present if the driver of the motor vehicle stops the engine for example or goes from the previous operating state into a full-load state. In this case the method is quit and started again at another time. The method is restarted for example at regular intervals in which the above conditions are queried. It is likewise conceivable to carry out a permanent interrogation of the above conditions so that the method will be started each time that a suitable operating point is present.

In the next method step factorial adaptation values for the injection system of the internal combustion engine are learned. Since the internal combustion engine comprises a plurality of cylinders and each cylinder is equipped with an individual injection system, for example an injector, these factorial adaptation values are determined on a cylinder-selective basis. To simplify the learning of the cylinder-selective factorial adaptation values, this step is carried out under nominal conditions, i.e. by injecting only a single injection quantity into the respective cylinder. The injection quantity which is brought into the corresponding cylinder by the injection system by single injection is prespecified for example by an engine management system of the internal combustion engine. The engine management system operates for this default on the basis of the existing operating point (see above) of the internal combustion engine and of a desired Lambda value that is to be achieved after injection and ignition of the mixture has taken place. In accordance with the specifications of the engine management system the cylinder-specific injection system or the injector is thus controlled with a specific voltage so that a single injection of the requested fuel quantity is provided. After single injection and ignition of the mixture has taken place the cylinder-selective Lambda value is determined and compared with the desired or prespecified global Lambda value for the engine. Should these two values deviate from one another, a correction of the control of the injector must be undertaken until the cylinder-selective Lambda value matches the desired Lambda value determined by the engine management system. This correction is made with the aid of the factorial adaptation value which controls the specific control voltage or generally the activation of the cylinder-specific injector or adapts it until the prespecified Lambda value is reached.

As soon as this process is completed the factorial adaptation value determined is stored depending on the available operating point of the internal combustion engine and the cylinder-specific single injected fuel quantity. Thus an adaptation of the control of the cylinder-specific injection system prespecified by the engine management device is undertaken with the aid of the factorial adaptation value so that even actually in the adapted cylinder of the internal combustion engine the prespecified Lambda value is achieved under the prespecified operating conditions of the internal combustion engine.

After the factorial adaptation value has been successfully learned at this operating point of the internal combustion engine, the method moves to the next step. In this step a check is made as to whether the general conditions already discussed above for executing a cylinder-selective Lambda control (ZSLR) obtain. It is thus asked whether the internal combustion engine is in an operating state for which factorial adaptation values have been learned during single injection. In accordance with the embodiment of the present method shown in FIG. 1 it is thus asked whether the constant operating point is still present in which the learning of the factorial adaptation values took place. It is however also conceivable for the question to be asked within this method step as to whether the internal combustion engine is in a stable operating point for which factorial adaptation values have already been learned with the aid of single injections for the cylinder-specific injection system. With this query it is thus ensured that for the further method, operating conditions of the internal combustion engine are present which are comparable with operating conditions and determined factorial adaptation values under normal conditions. In addition it is ensured that factorial adaptation values for this operating state of the internal combustion engine already exist. These factorial adaptation values namely deliver an adaptation of the injection control to the prespecified global engine Lambda value as a function of the operating point of the internal combustion engine. If subsequently only the method of dispensing the prespecified cylinder-specific fuel quantity is changed while the overall state of the internal combustion engine is kept constant, Lambda fluctuations related to the prespecified Lambda value are able to be attributed purely to the inaccuracies of the injection system in dispensing the fuel quantity. This knowledge creates the basis for how a further correction or a further cylinder-selective Lambda control is able to be carried out.

Should the general conditions for the function of the cylinder-selective control thus be present and the factorial adaptation be completed under nominal conditions, the method moves to the next method step (cf. "Yes" arrow). Should this not be the case, for example because of the changes of state of the internal combustion engine described above, the method is quit at this point. In the same way as has been explained above, the present method is started again at a later time.

In the next method step the injection quantity of the single injection factorially adapted for the current operating point of the internal combustion engine is divided up or split up into a main injection quantity and one or more small injection quantities. A multiple injection takes place under the same operating conditions as a single injection in order to achieve the prespecified Lambda value.

After the ignition of the multiply injected factorially adapted fuel quantity the cylinder-selective Lambda value is determined and compared with the prespecified Lambda value. If the prespecified Lambda value does not match the determined cylinder-selective Lambda value the Lambda variations are triggered by a changed type of dispensing of the prespecified factorially adapted fuel quantity. The reason for these Lambda fluctuations lies in the fact that the injection system has tolerances in the control of the dispensing of small quantities so that fluctuations in the injected fuel quantities arise in accordance with the number and size of the small quantities.

To enable these Lambda fluctuations to be compensated for, in the next method step additive adaptation values are learned which balance out fluctuations in the injected fuel quantities via the control of the cylinder-specific injection systems. In a similar way to under nominal conditions the learning of the additive adaptation values is undertaken by comparing the prespecified global engine Lambda value with the cylinder-selective Lambda value determined. The additive adaptation value is regulated until such time as there is a match between these two Lambda values.

Depending on the operating point of the internal combustion engine and the composition of the injection quantity from a main quantity and one or more small quantities, the additive adaptation values are stored for specific cylinders. In general terms there is thus a fine tuning with the aid of the additive adaptation values of the injection quantity to the dispensing of the prespecified factorially adapted injection quantities in the form of main and small quantity. The additive adaptation values thus correct errors in the fuel dispensing in the form of small quantities which would give rise to undesired Lambda fluctuations. With the method steps described factorial and additively adapted control signals of the cylinder-specific injection systems are determined so that the actual fuel quantity required is injected as a function of the injection type (single or multiple injection) and is injected to obtain a specific Lambda value. This method is preferably executed in the motor vehicle as onboard adaptation so that the control of the injection system is automatically updated or permanently held in an exact state. This is equivalent for example to changes to the injectors through ageing or temperature influences.

The above method is preferably carried out in the mid speed and load range of the internal combustion engine. In this operating range the amplitudes of the useful signal are higher than the noise signal, so that they are evaluated reliably. During learning of the additive adaptation values attention is also paid to the fact that additive adaptation values for injected small quantities are learned which are likewise included for a single or multiple injection in the lower speed and load range of the internal combustion engine. It has namely been shown that with single and multiple injection with the same small quantities in the lower load range as in the mid load range the same Lambda variations are produced. Thus the Lambda value difference which is produced by splitting up the injection quantity into main and small quantity is interpreted in the lower load range on injection of the same small quantity as an offset which is able to be balanced out with the aid of the additive adaptation values. In this way actual Lambda variations, which are barely to be detected in the small load range because of the noise, are reconstructed in the mid load range of the internal combustion engine and subsequently applied to the lower load range of the internal combustion engine. In other words the advantage of the present method thus lies in the fact that the compensation for cylinder-selective injection variations of the direct injection valves in the lower load range can be undertaken by mapping the air-fuel conditions from the lower load range in the mid load range with the aid of multiple injection.

The schematic program execution sequence in FIG. 2 shows a method in which the cylinder-selective Lambda control (ZSLR) is not active. In this method however, according to the operating mode of the injection system, the factorial and additively adapted values determined with the aid of the cylinder-selective Lambda control factor are applied. This means for example that the engine management system accesses the above determined factorial and/or additive adaptation values for the control of the cylinder-specific injection system in order to obtain the desired Lambda value in an efficient manner.

After the method shown in FIG. 2 has been started, in which the cylinder-selective Lambda control is not active, the injection mode currently being used in the internal combustion engine is first queried. If the answer to the question: "Presence of a single injection?" is no, the method follows the arrow appropriately indicated by the word no. in this case there is multiple cylinder-selective injection, with the overall injection quantity being produced from the sum of the part quantities.

The multiple injection is made up of a main quantity and one or more small quantities. To obtain the Lambda value prespecified by the engine management system, for activation of the main quantity the factorial adaptation value is applied to the control values of the injection system. In the same way the additive adaptation value is applied to the small quantity/small quantities to be injected. Should main and/or small quantities have been requested for multiple injection, for which no specific adaptation value has been determined within the framework of the cylinder-selective Lambda control, the corresponding adaptation values are determined by interpolation or extrapolation using the available determined adaptation values. If for example there is thus no specific additive adaptation value available for a small quantity, a weighted additive adaptation value for the specific small quantity to be injected is determined and applied to the control of the injection system.

If the outcome of the request for the injection operating mode is that the internal combustion engine is operating with single injection, a further query is made as to the load and speed range in which the internal combustion engine is operating. If it is in the lower load and speed range, the method continues in the direction of the "Yes" arrow. If the internal combustion engine is operating in a range other than the lower load and speed range, the method continues in the direction of the "No" arrow.

When the internal combustion engine is operating outside of the lower load and speed range, for single injection of the fuel quantity the corresponding cylinder-selective factorial adaptation values are applied to the respective injector/the injection system. As has already been described in detail above, the operating point of the internal combustion engine or the general conditions for identifying the appropriate factorial adaptation values are included.

If the internal combustion engine is in the lower load and speed range smaller quantities of fuel are injected compared to the other load and speed ranges. These fuel quantities correspond for example to the small quantities which are brought in cylinder-selectively for the multiple injection described above. Thus the cylinder-selective additive adaptation values that have been determined with the aid of the cylinder-selective control in the mid load and speed range are employed for adapting the control of the cylinder-specific injection system.

After the injection in the respective operating mode of the internal combustion engine has been undertaken, the algorithm shown in FIG. 2 is ended. Thus the adaptation values previously determined with the aid of the cylinder-selective Lambda control are used through the selection algorithm in accordance with FIG. 2 by suitable selection in different engine operating modes or load and speed ranges.

the various embodiments thus have the advantage that non-linear injection variations are able to be determined with the aid of the cylinder-selective Lambda control even in the lower fuel quantity range. This makes it possible to regulate out and compensate for these cylinder-selective injection variations in the low fuel quantity range, in order to be able to set a prespecified Lambda value. These methods contribute directly for example to improving the emission behavior of the internal combustion engine on cold start. Furthermore they support a catalytic converter hot phase.

The invention claimed is:

1. A method for adapting variations in cylinder-selective injection quantities of a direct injection system of an internal combustion engine with a plurality of cylinders, comprising the following steps:
   a. injecting a prespecified cylinder-specific fuel quantity as a single quantity into the cylinder in accordance with a prespecified Lambda value,
   b. determining a cylinder-selective Lambda value resulting from the single quantity injection of the prespecified cylinder-specific fuel quantity,
   c. comparing the prespecified Lambda value with the cylinder-selective Lambda value determined from the single quantity injection of the prespecified cylinder-specific fuel quantity,
   d. if the cylinder-selective Lambda value does not match the prespecified Lambda value, determining a first adaptation value for adapting the prespecified cylinder-specific fuel quantity, so that the cylinder-selective Lambda value resulting from the adapted cylinder-specific fuel quantity is synchronized with the prespecified Lambda value,
   e. injecting into the cylinder the adapted cylinder-specific fuel quantity in the form of a plurality of fuel quantities, and determining a resulting second cylinder-selective Lambda value,
   f. comparing the prespecified Lambda value with the second cylinder-selective Lambda value determined from the plural quantity injection of the adapted cylinder-specific fuel quantity, and
   g. if the second cylinder-selective Lambda value does not match the prespecified Lambda value, determining a second adaptation value for further adapting the adapted cylinder-specific fuel quantity, so that the cylinder-selective Lambda value resulting from the further adapted cylinder-specific fuel quantity is synchronized with the prespecified Lambda value.

2. The adaptation method according to claim 1, wherein the first adaptation value is a factorial adaptation value and the second adaptation value is an additive adaptation value.

3. The adaptation method according to claim 1, wherein the injection only takes place if the internal combustion engine is in a practically constant operating state, so that comparability between single and multiple injection is guaranteed.

4. The adaptation method according to claim 1, wherein the plurality of injection quantities consists of a main quantity and at least one small quantity less than the main quantity.

5. The adaptation method according to claim 1, wherein the first and the second adaptation values are determined in the average load range of the internal combustion engine.

6. The adaptation method according to claim 5, wherein the second adaptation value is determined in the mid load range and then applied in the lower load range of the internal combustion engine on injection of a plurality of injection quantities.

7. A method for cylinder-selective injection control in an internal combustion engine with injection system, comprising the following steps:
   a. determining a first adaptation value for adapting a prespecified cylinder-specific fuel quantity to inject into a cylinder in the form of a single quantity in order to achieve a prespecified Lambda value,
   b. determining a second adaptation value for adapting the prespecified cylinder-specific fuel quantity to inject into the cylinder in the form of plural quantities in order to achieve the prespecified Lambda value,
   c. adapting the prespecified cylinder-specific fuel quantity with both the first and second adaptation values, before the fuel quantity is injected in the form of a plurality of fuel quantities,
   d. adapting the prespecified cylinder-specific fuel quantity with the second adaptation value, before the fuel quantity is injected in a lower load and speed range in the form of a single fuel quantity, and
   e. adapting the prespecified cylinder-specific fuel quantity with the first adaptation value, but not the second adaptation value, before the fuel quantity is injected in a range other then the lower load and speed range in the form of a single fuel quantity.

8. A device for adapting variations in cylinder-selective injection quantities of a direct injection system of an internal combustion engine with a plurality of cylinders, comprising:
   a. means for injecting a prespecified cylinder-specific fuel quantity as a single quantity into the cylinder in accordance with a prespecified Lambda value,
   b. means for determining a cylinder-selective Lambda value resulting from the single quantity injection of the prespecified cylinder-specific fuel quantity,
   c. means for comparing the prespecified Lambda value with the cylinder-selective Lambda value determined from the single quantity injection of the prespecified cylinder-specific fuel quantity,
   d. means for, if the cylinder-selective Lambda value does not match the prespecified Lambda value, determining a first adaptation value for adapting the prespecified cylinder-specific fuel quantity, so that the cylinder-selective Lambda value resulting from the adapted cylinder-specific fuel quantity is synchronized with the prespecified Lambda value,
   e. means for injecting into the cylinder the adapted cylinder-specific fuel quantity in the form of a plurality of fuel quantities and determining a resulting second cylinder-selective Lambda value,
   f. means for comparing the prespecified Lambda value with the second cylinder-selective Lambda value determined from the plural quantity injection of the adapted cylinder-specific fuel quantity, and
   g. means for determining, if the second cylinder-selective Lambda value does not match the prespecified Lambda value, a second adaptation value for further adapting the adapted cylinder-specific fuel quantity, so that the cylinder-selective Lambda value resulting from the further adapted cylinder-specific fuel quantity is synchronized with the prespecified Lambda value.

9. The device according to claim 8, wherein the first adaptation value is a factorial adaptation value and the second adaptation value is an additive adaptation value.

10. The device according to claim 8, wherein the injection only takes place if the internal combustion engine is in a practically constant operating state, so that comparability between single and multiple injection is guaranteed.

11. The device according to claim 8, wherein the plurality of injection quantities consists of a main quantity and at least one small quantity less than the main quantity.

12. The device according to claim 8, wherein the first and the second adaptation values are determined in the average load range of the internal combustion engine.

13. The device according to claim 12, wherein the second adaptation value determined in the mid load range is applied in the lower load range of the internal combustion engine on injection of a plurality of injection quantities.

* * * * *